United States Patent
Falkenburg et al.

(10) Patent No.: US 7,797,462 B2
(45) Date of Patent: *Sep. 14, 2010

(54) METHOD AND APPARATUS FOR COMMUNICATING WITH AN EMBEDDED CONTROLLER WHICH INCLUDES A REFERENCE TO METADATA OBJECTS

(75) Inventors: David R. Falkenburg, San Jose, CA (US); Ryan A. Hoagland, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 12/197,609

(22) Filed: Aug. 25, 2008

(65) Prior Publication Data

US 2008/0313358 A1 Dec. 18, 2008

Related U.S. Application Data

(63) Continuation of application No. 11/433,620, filed on May 12, 2006, now Pat. No. 7,418,529.

(51) Int. Cl.
*G06F 3/00* (2006.01)
*G06F 15/16* (2006.01)
*G06F 7/00* (2006.01)

(52) U.S. Cl. .......... 710/16; 710/8; 710/9; 710/10; 710/15; 710/33; 707/3; 707/8; 707/2; 707/10; 711/100; 711/141

(58) Field of Classification Search ............ 710/8–10, 710/15, 16, 33; 711/100, 141; 707/2, 3, 707/8, 10
See application file for complete search history.

(56) References Cited

U.S. PATENT DOCUMENTS

| | | | | |
|---|---|---|---|---|
| 5,701,516 A * | 12/1997 | Cheng et al. | ................ | 710/22 |
| 6,240,416 B1 * | 5/2001 | Immon et al. | ................ | 707/10 |
| 6,732,084 B1 * | 5/2004 | Kabra et al. | ................ | 707/2 |
| 6,976,119 B2 * | 12/2005 | Qureshi et al. | ............. | 711/104 |
| 6,996,556 B2 * | 2/2006 | Boger et al. | ................ | 707/3 |
| 7,146,524 B2 * | 12/2006 | Patel et al. | ................ | 714/6 |
| 7,318,062 B2 * | 1/2008 | Wu et al. | ................ | 707/100 |
| 7,356,622 B2 * | 4/2008 | Hattrup et al. | ............... | 710/33 |
| 2002/0026472 A1 * | 2/2002 | Wolfman et al. | ........... | 709/203 |

* cited by examiner

*Primary Examiner*—Tammara Peyton
(74) *Attorney, Agent, or Firm*—Park, Vaughan & Fleming LLP; Anthony P. Jones

(57) ABSTRACT

A system that communicates with an embedded controller within a computing device. During operation, the system queries the embedded controller to obtain information describing an interface for interacting with a functionality provided by the embedded controller. The system then receives a response from the computing device which includes a reference to a metadata object describing the interface. If the metadata object refers to other metadata objects, the system recursively queries the embedded controller to obtain information about the other metadata objects until a complete description of the interface is obtained.

20 Claims, 6 Drawing Sheets

METHOD AND APPARATUS FOR COMMUNICATING WITH AN EMBEDDED CONTROLLER WHICH INCLUDES A REFERENCE TO METADATA OBJECTS

RELATED APPLICATION

This application is a continuation of, and hereby claims priority under 35 U.S.C. §120 to, pending U.S. patent application Ser. No. 11/433,620, filed 12 May 2006, entitled "Method and Apparatus for Communicating with an Embedded Controller within a Computing Device."

BACKGROUND

1. Field of the Invention

The present invention relates generally to mechanisms for communicating between components within computing devices. More specifically, the present invention relates to an object-based technique for communicating between a host and an embedded controller within a computing device.

2. Related Art

As computer systems become increasingly more sophisticated, they have begun to include mechanisms to perform system-management functions, such as thermal management and power management. However, in some cases, using the central processing unit (CPU) and the operating system (OS) to handle these system-management functions does not make sense. For example, using the CPU to perform thermal-management operations can be counterproductive because the CPU, which is the highest-power consuming component in the computer system, is being used to manage power consumption. Hence, it is advantageous to manage some of these system-management functions using a separate embedded controller. For example, embedded controllers can be used to perform thermal-management operations and to configure and control various devices within the computer system.

In order to communicate with an embedded controller, a communication protocol is needed. One such protocol is the Advanced Configuration and Power Interface (ACPI) protocol. Unfortunately, this standard protocol does not provide much flexibility to add new devices and new functionality to the computer system. One solution to this problem is to simply extend the protocol to accommodate new devices. Unfortunately, this solution requires the communication protocol to be modified each time a new device is added to the computer system.

Hence, what is needed is a method and an apparatus for interacting with a computing device without the problems described above.

SUMMARY

One embodiment of the present invention provides a system that communicates with an embedded controller within a computing device. During operation, the system queries the embedded controller to obtain information describing an interface for interacting with a functionality provided by the embedded controller. The system then receives a response from the computing device which includes a reference to a metadata object describing the interface. If the metadata object refers to other metadata objects, the system recursively queries the embedded controller to obtain information about the other metadata objects until a complete description of the interface is obtained.

In a variation on this embodiment, the metadata object includes: a data pointer, which points to data for the interface; a field pointer, which points to fields which specify characteristics of the data; and a description pointer, which points to a description of the structure of the data.

In a further variation, the fields can specify whether the data is readable and/or writeable, whether the data is atomic, and the size of the data.

In a further variation, the description of the structure of the data defines data items contained within the data, wherein a definition of a data item can specify a basic data type or can be a reference to another metadata object.

In a further variation, the system retrieves data pointed to by the data pointer and uses the description of the structure of the data to parse the retrieved data.

In a further variation, if the metadata object is associated with a function, reading the data causes the function to be executed on the embedded controller and also causes a result of the function and a success code to be returned from the computing device.

In a variation on this embodiment, each metadata object defines a "key." In this variation, the embedded controller supports the following functions involving keys: a function which reads a key, a function which writes a key, a function which counts keys supported by the embedded controller, a function which returns a key by index, and a function which returns information about a key.

In a variation on this embodiment, the system interacts with the embedded controller through a second non-extensible interface, which is not described through metadata.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Computer System

Figure 1:
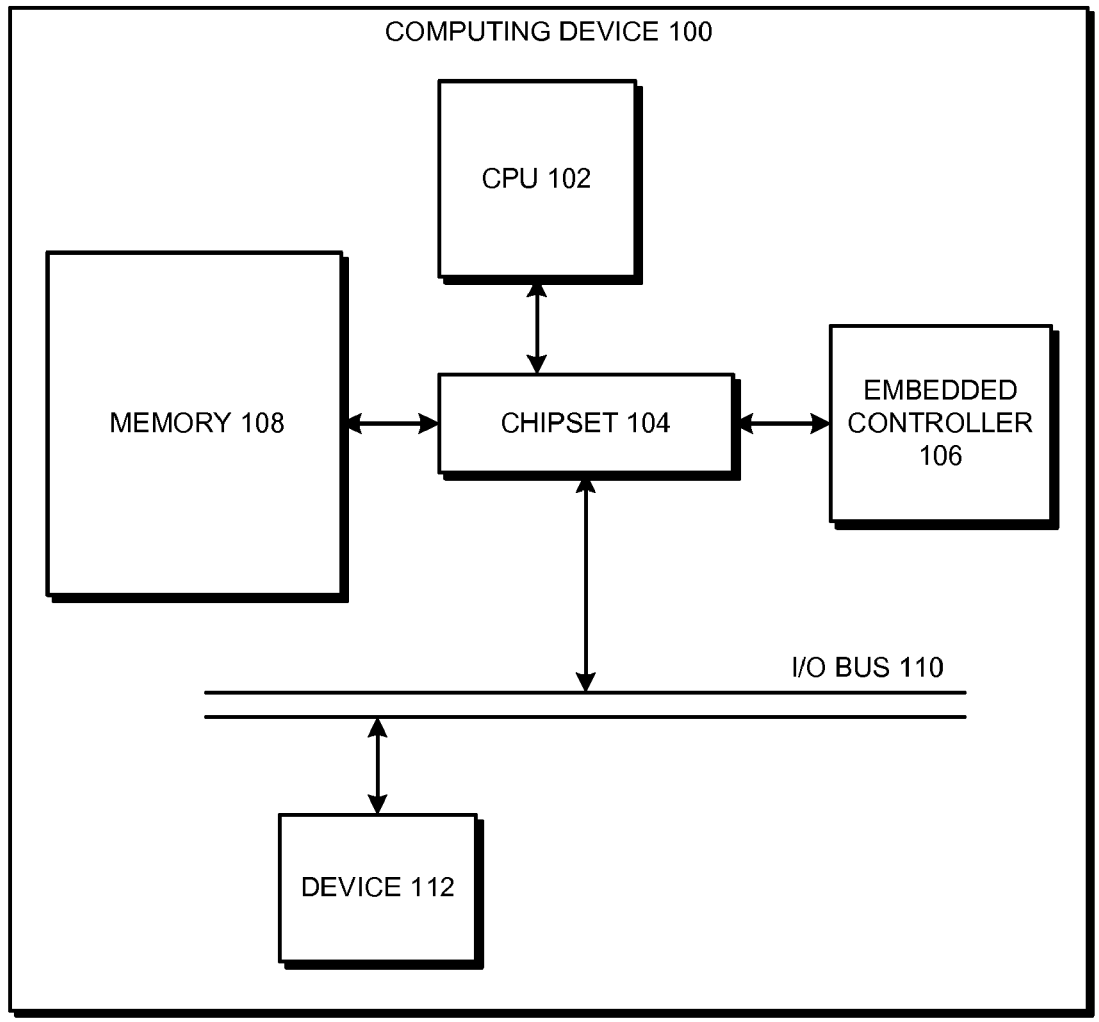
FIG. 1 presents a block diagram of a computing device which contains a CPU, a chipset, and an embedded controller in accordance with an embodiment of the present invention.

FIG. 1 presents a block diagram of computing device 100 which contains CPU 102, chipset 104, and embedded controller 106 in accordance with an embodiment of the present invention. Computing device 100 also includes memory 108, I/O bus 110, and device 112. CPU 102 can generally include any type of processor, including, but not limited to, a microprocessor, a mainframe computer, a digital signal processor, a personal organizer, a device controller and a computational engine within an appliance.

Chipset 104 can include any type of core logic unit or bridge chip that is commonly used to couple together components within a computing device.

Embedded controller 106 performs various system-management operations, such as power management, thermal management, controlling lighting levels, and controlling status lights. In doing so, embedded controller 106 communicates with CPU 102 through a set of architecturally visible registers. In one embodiment of the present invention, embedded controller 106 includes an operating system (OS) which is programmed to communicate with system devices. For example, embedded controller 106 can configure and control system devices such as batteries, power sensors, status lights, fans, motion sensors, ambient light sensors, keyboard backlights, and lid switches.

Note that system devices such as batteries and lid switches are presently supported by the ACPI communications protocol standard. Hence, one embodiment of the present invention uses the ACPI communications protocol to communicate with system devices which are supported by the ACPI standard, and uses a second communication protocol to communicate with system devices which are not supported by the ACPI standard. In this embodiment, embedded controller 106 provides a self-describing interface to interact with system devices which are not supported by the ACPI standard.

Key Structure

Figure 2:
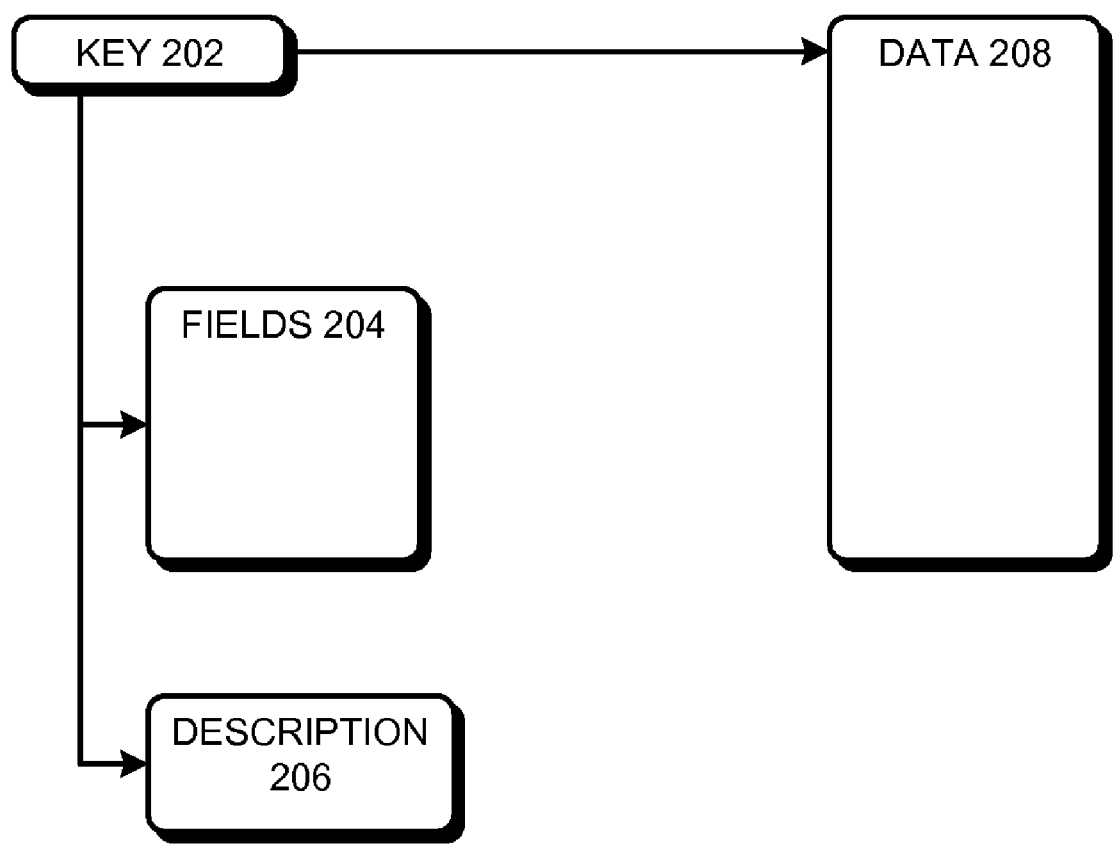
FIG. 2 presents a block diagram illustrating the structure of the metadata object for a key in accordance with an embodiment of the present invention.

FIG. 2 presents a block diagram illustrating the structure of a metadata object for a key in accordance with an embodiment of the present invention. The metadata object for key 202 points to data 208, fields 204 and description 206.

In one embodiment of the present invention, the metadata object for key 202 includes: (1) a data pointer, which points to data for the interface; (2) a field pointer, which points to fields which specify characteristics of the data; and (3) a description pointer, which points to a description of the structure of the data.

In one embodiment of the present invention, the fields can specify whether the data is readable and/or writeable, whether the data is atomic, and the size of the data.

In one embodiment of the present invention, the description of the structure of the data defines data items contained within the data. In this embodiment, a definition of a data item can specify a basic data type or can be a reference to another metadata object which describes the data object.

In one embodiment of the present invention, keys can access information from various sensors within the computer system. For example, keys can be used to access information about power consumption in the computer system, the temperature of components within the computer system, the speed of fans within the computer system, the ambient light level, and signals from accelerometers in the computer system.

In one embodiment of the present invention, writing a value to a "force register" for a sensor key causes the system to break a control loop controlling a device referred to by the sensor key, and to force the device into a state specified by the value written to the force register.

In one embodiment of the present invention, keys can control the behavior of devices within a system. For example, control keys can interact with devices such as status lights and keyboard backlights. In this embodiment, a value can be written to a given control key to specify a behavior for a given device. For example, a control key for the status light can determine whether the status light "breathes" (i.e., the intensity of the light periodically increases and decreases), whether the status light is turned on with a specific intensity, whether the status light should be turned off, or whether the status light should flash. Similarly, a control key can cause the keyboard backlight to turn on to a specific intensity, or can cause the keyboard backlight to turn off.

In one embodiment of the present invention, a debug key provides direct access to the memory within the embedded controller for debugging purposes.

Using Keys

One embodiment of the present invention uses metadata objects to provide a flexible interface. These metadata objects can describe the size, the functional parameters, and the data organization for such a flexible interface.

In one embodiment of the present invention, the flexible interface operates using two phases: (1) a discovery phase and (2) an access phase. During the discovery phase, the host issues a command which causes the embedded controller to return the number of objects n that the embedded controller supports. Then, from 0 to n−1, the host issues a command which causes the embedded controller to return a metadata object which contains information about a given object n. In one embodiment of the present invention, the metadata object includes: an object reference value, which is a unique identifier for the object (i.e., a key); a functional description of the object, which can indicate whether the object is readable or writable; a data organization description of the object; the size of the object; and one or more references to other objects which describe the data organization of the object. Note that there are two different types of keys: "object keys," which refer to data for the interface, and "description keys," which describe the data referred to by object keys.

Figure 3A:
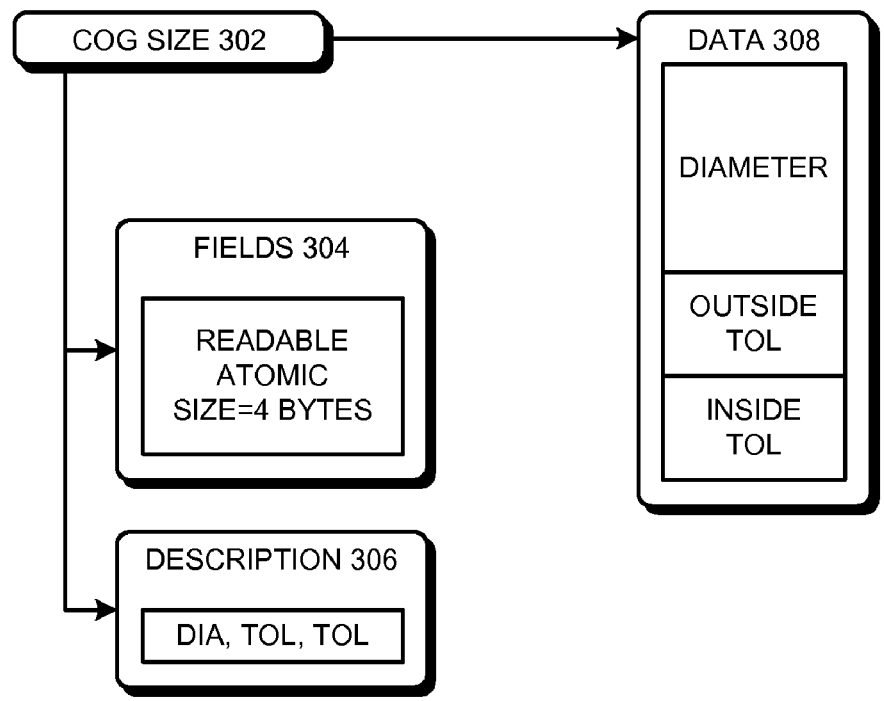
FIG. 3A presents an exemplary block diagram of a key in accordance with an embodiment of the present invention.

During the access phase, the host is free to read or write the keys it has discovered during the discovery phase. Note that during the access phase, it is important for the host to understand the manner in which data is organized within the key. For example, FIG. 3A presents an exemplary block diagram of cog size key 302 in accordance with an embodiment of the present invention. Fields 304 indicates that data 308 is readable, is 4 bytes, and is "atomic." Description 306 indicates that data 308 contains the outer diameter of the cog and tolerances of the cog (outside tol and inside tol). Since the host does not know anything about these objects (other than the names of the objects), the host issues a command to request metadata objects for diameter, inside tol, and outside tol. If these requested metadata objects themselves contain descriptions which the system does not know about, the system recursively queries the embedded controller until a complete description of the object is obtained. Note that in this example, the diameter is 2 bytes and the outside tolerance and inside tolerance are 1 byte each. Also note that the diameter and tolerances are combined into one object key (i.e., cog size 302). Since this object key is "atomic," these values are always updated together.

In one embodiment of the present invention, accessing a key that refers to atomic data causes the embedded controller to suspend all operations until the embedded controller returns the atomic block of data referred to by the key, thereby preserving the integrity of the atomic block of data.

A "data organization" description key describes the various bits of information contained within the data referred to by an object key. Description keys contain basic data types and can also refer to higher-level description keys. For example, the basic data structure building blocks are basic data types can include "32-bit unsigned integer" or "14.2 fixed-point number." In the example in FIG. 3A, the description key for the tolerances of the diameter of the cog contains two basic data structure building blocks, both are "8-bit unsigned integers" which represent the inside and outside allowable tolerances, respectively.

Figure 3B:
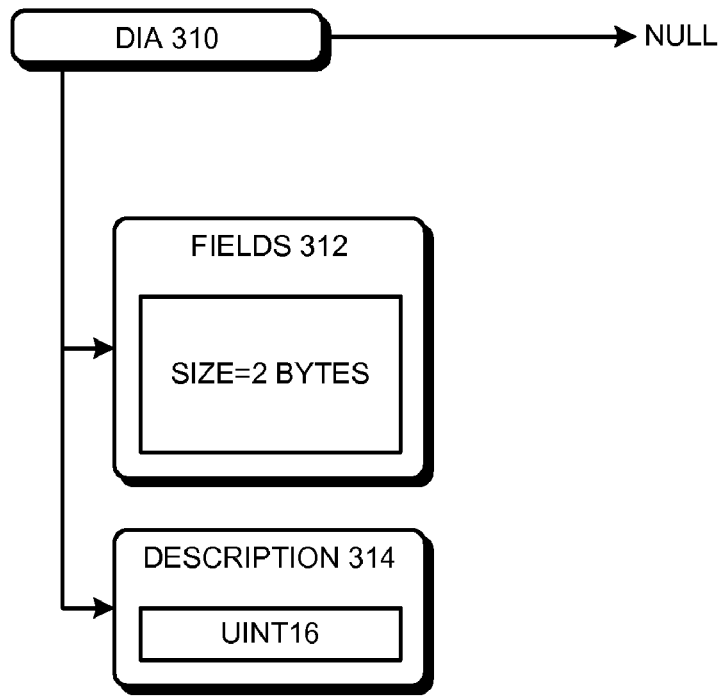
FIG. 3B presents an exemplary block diagram of the key referred to in FIG. 3A in accordance with an embodiment of the present invention.

FIG. 3B presents an exemplary block diagram of diameter key 310 referred to in description 306 in FIG. 3A in accordance with an embodiment of the present invention. Diameter key 310 is a description key for the diameter of the cog. Fields 312 indicates that the diameter is 2 bytes in size. Description 314 indicates that the data type for the diameter is a "UINT16" (a 16-bit unsigned integer).

In one embodiment of the present invention, description keys can be nested to build complex data structures.

If, at a later time, the data type for the diameter needs to be changed from UINT16 to another data type, only description 314 in FIG. 3B needs to be changed. For example, description 314 can indicate that the data type of the diameter is a fixed point 8.8 number. Furthermore, description 314 can refer to another metadata object which provides a description of the data organization of diameter key 310.

Using the above data structure, it is possible for a host to make minimal assumptions about the hardware it is running on. In addition, backwards hardware compatibility can be maintained by adding more complex keys to future versions of hardware. Old software can simply ignore keys of which it has no knowledge of them.

Figure 4:
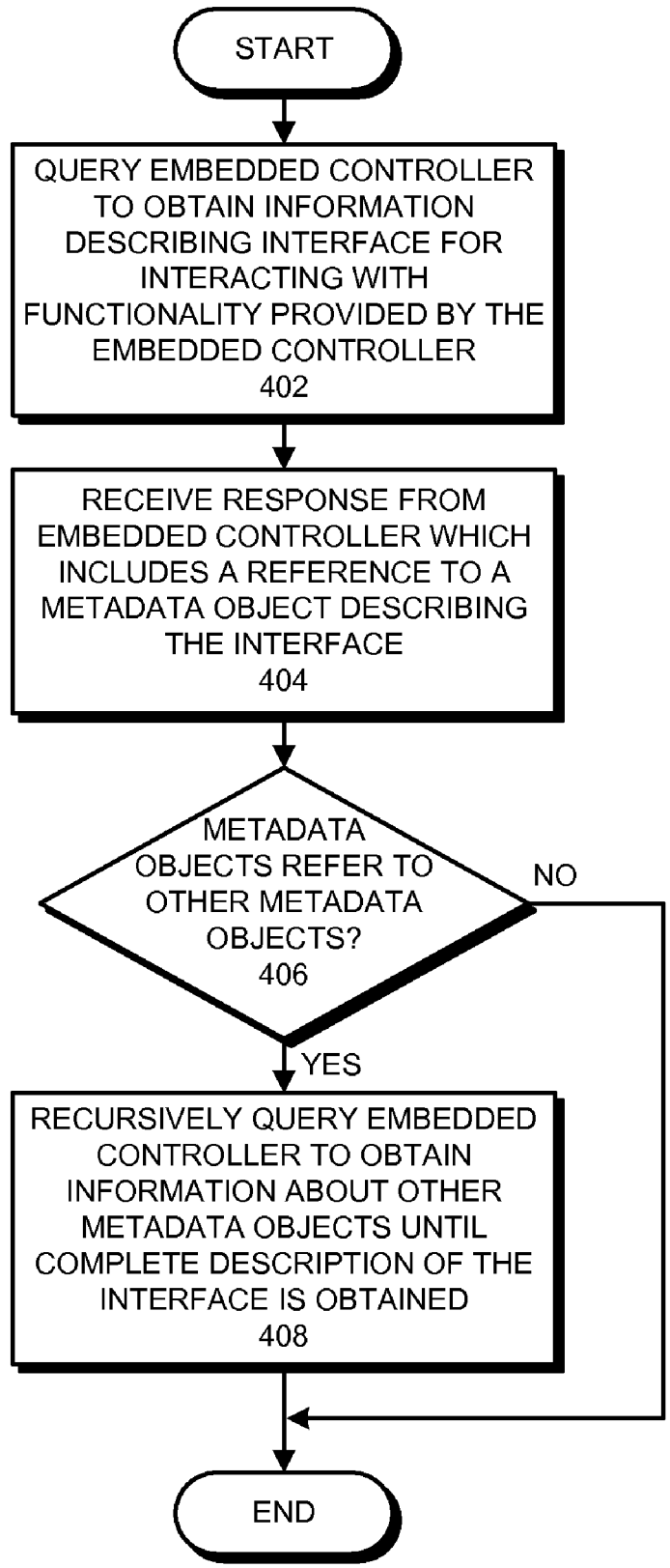
FIG. 4 presents a flow chart illustrating the process of obtaining a description of an interface in accordance with an embodiment of the present invention.

FIG. 4 presents a flow chart illustrating the process of obtaining a description of the data organization for an object stored in a computing device in accordance with an embodiment of the present invention. The process begins when the system queries the embedded controller to obtain information describing an interface for interacting with a functionality provided by the embedded controller (step 402). Next, the system receives a response from the embedded controller which includes a reference to a metadata object describing the interface (step 404). If the metadata object refers to other metadata objects (step 406), the system recursively queries the embedded controller to obtain information about the other metadata objects until a complete description of the interface is obtained (step 408).

In one embodiment of the present invention, the system retrieves the data contained in the object from the computing device and uses the complete description of the object to parse the data contained in the object.

In one embodiment of the present invention, while retrieving the data contained in the object, the system issues a read command to the computing device, wherein the read command includes an argument which specifies the size of the data contained in the object. The system then receives the data contained in the object from the computing device.

Function Key

Figure 5:
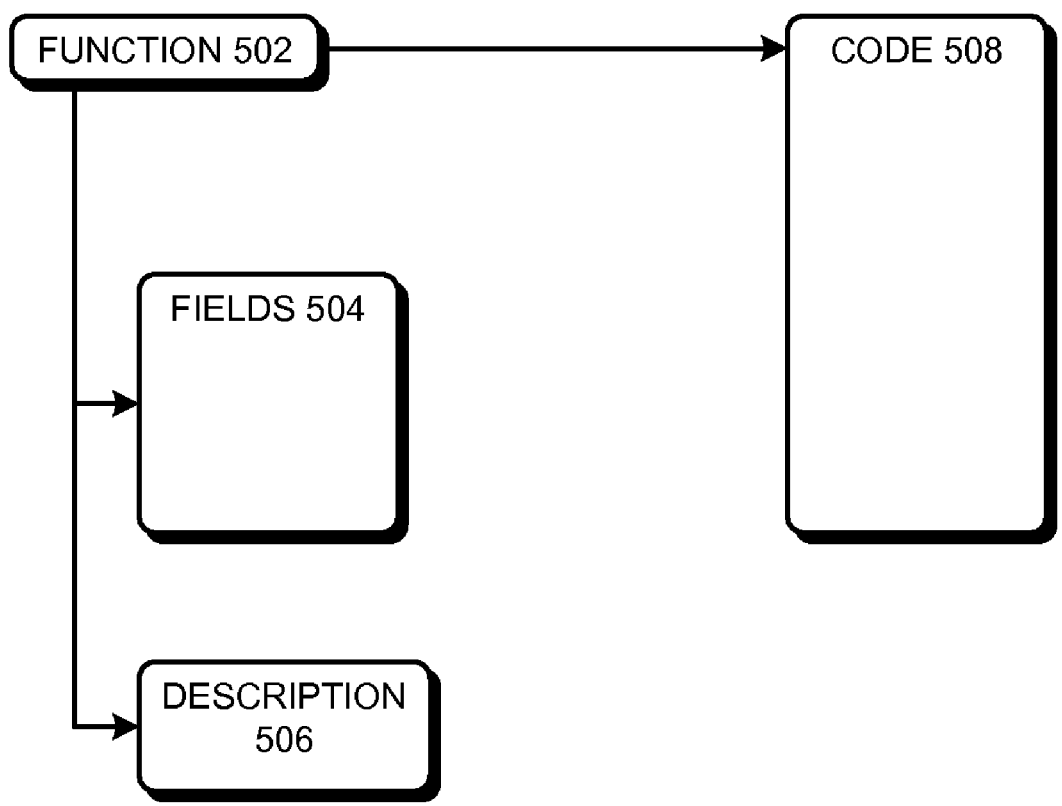
FIG. 5 presents a block diagram illustrating the structure of the metadata object for a function in accordance with an embodiment of the present invention.

Note that a key can also be associated with a function. FIG. 5 presents a block diagram illustrating the structure of the metadata object for function 502 in accordance with an embodiment of the present invention. The metadata object for function 502 includes fields 504 and description 506. Function 502 refers to a block of code 508 which is executed by the embedded controller. The embedded controller returns data with a size specified in fields 504 and with a data structure specified in description 506.

Figure 6:
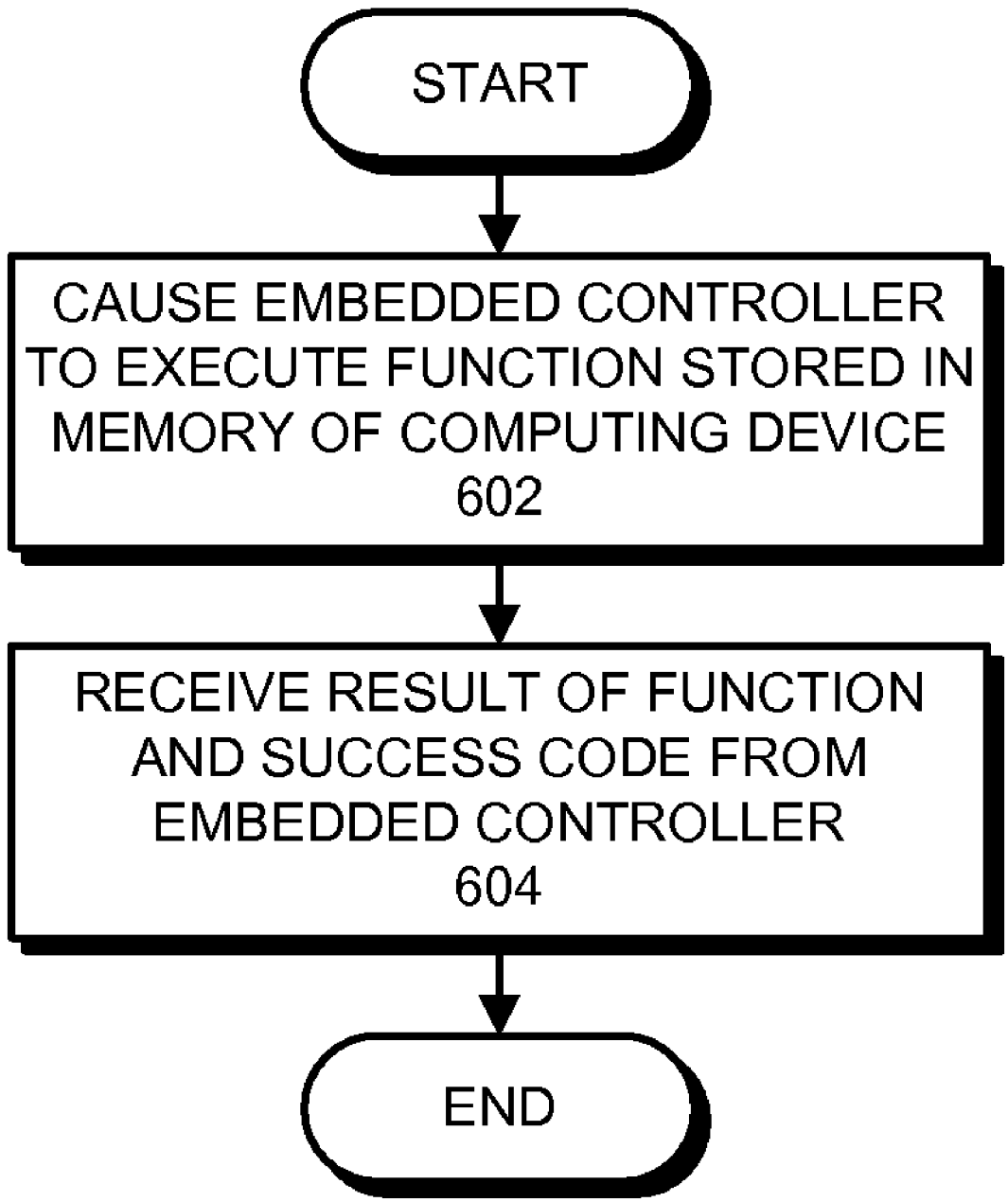
FIG. 6 presents a flow chart illustrating the process of executing a function in accordance with an embodiment of the present invention.

FIG. 6 presents a flow chart illustrating the process of executing a function in accordance with an embodiment of the present invention. The process begins when the system reads the data referred to by an object key and causes the embedded controller to execute a function stored in the memory of the computing device (step 602). The system then receives a result of the function and a success code from the embedded controller (step 604).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for communicating with an embedded controller within a computing device, comprising:
   querying the embedded controller to obtain information describing an interface for interacting with a functionality provided by the embedded controller for at least one of monitoring, configuring, or controlling one or more devices in the computing device, wherein the embedded controller is a separate processing device for performing system management operations;
   receiving a response from the embedded controller which includes a reference to a metadata object describing the interface; and
   if the metadata object refers to other metadata objects, recursively querying the embedded controller to obtain information about the other metadata objects until a complete description of the interface is obtained.

2. The method of claim 1, wherein the metadata object includes:
   a data pointer, which points to data for the interface;
   a field pointer, which points to fields which specify characteristics of the data; and
   a description pointer, which points to a description of a structure of the data.

3. The method of claim 2, wherein the fields can specify:
   whether the data is readable and/or writeable;
   whether the data is atomic; and
   a size of the data.

4. The method of claim 2,
   wherein the description of the structure of the data defines data items contained within the data; and
   wherein a definition of a data item can specify a basic data type or can be a reference to another metadata object describing the structure of the data.

5. The method of claim 2, further comprising:
   retrieving data pointed to by the data pointer; and
   using the description of the structure of the data to parse the retrieved data.

6. The method of claim 2, wherein if the metadata object is associated with a function, reading the data causes the function to be executed on the embedded controller and also causes a result of the function and a success code to be returned from the computing device.

7. The method of claim 1, wherein each metadata object defines a "key," and wherein the embedded controller supports one or more of the following functions involving keys:
 a function which reads a key;
 a function which writes a key;
 a function which counts keys supported by the embedded controller;
 a function which returns a key by index; and
 a function which returns information about a key.

8. The method of claim 1, wherein the method further comprises interacting with the embedded controller through a second non-extensible interface, which is not described through metadata.

9. A computer-readable storage medium storing instructions that when executed by a computer cause the computer to perform a method for communicating with an embedded controller within a computing device, wherein the method comprises:
 querying the embedded controller to obtain information describing an interface for interacting with a functionality provided by the embedded controller for at least one of monitoring, configuring, or controlling one or more devices in the computing device, wherein the embedded controller is a separate processing device for performing system management operations;
 receiving a response from the embedded controller which includes a reference to a metadata object describing the interface; and
 if the metadata object refers to other metadata objects, recursively querying the embedded controller to obtain information about the other metadata objects until a complete description of the interface is obtained.

10. The computer-readable storage medium of claim 9, wherein the metadata object includes:
 a data pointer, which points to data for the interface;
 a field pointer, which points to fields which specify characteristics of the data; and
 a description pointer, which points to a description of the structure of the data.

11. The computer-readable storage medium of claim 10, wherein the fields can specify:
 whether the data is readable and/or writeable;
 whether the data is atomic; and
 a size of the data.

12. The computer-readable storage medium of claim 10,
 wherein the description of the structure of the data defines data items contained within the data; and
 wherein a definition of a data item can specify a basic data type or can be a reference to another metadata object describing the structure of the data.

13. The computer-readable storage medium of claim 10, wherein the method further comprises:
 retrieving data pointed to by the data pointer; and
 using the description of the structure of the data to parse the retrieved data.

14. The computer-readable storage medium of claim 10, wherein if the metadata object is associated with a function, reading the data causes the function to be executed on the embedded controller and also causes a result of the function and a success code to be returned from the computing device.

15. The computer-readable storage medium of claim 9, wherein each metadata object defines a "key," and wherein the embedded controller supports one or more of the following functions involving keys:
 a function which reads a key;
 a function which writes a key;
 a function which counts keys supported by the embedded controller;
 a function which returns a key by index; and
 a function which returns information about a key.

16. The computer-readable storage medium of claim 9, wherein the method further comprises interacting with the embedded controller through a second non-extensible interface, which is not described through metadata.

17. An apparatus that communicates with an embedded controller within a computing device, comprising:
 the embedded controller, wherein the embedded controller is a separate processing device for performing system management operations;
 a querying mechanism configured to:
  query the embedded controller to obtain information describing an interface for interacting with a functionality provided by the embedded controller for at least one of monitoring, configuring, or controlling one or more devices in the computing device; and
  if the metadata object refers to other metadata objects, to recursively query the embedded controller to obtain information about the other metadata objects until a complete description of the interface is obtained; and
 a receiving mechanism configured to receive a response from the embedded controller which includes a reference to a metadata object describing the interface.

18. The apparatus of claim 17, wherein the metadata object includes:
 a data pointer, which points to data for the interface;
 a field pointer, which points to fields which specify characteristics of the data; and
 a description pointer, which points to a description of the structure of the data.

19. The apparatus of claim 17, wherein the fields can specify:
 whether the data is readable and/or writeable;
 whether the data is atomic; and
 a size of the data.

20. The apparatus of claim 17,
 wherein the description of the structure of the data defines data items contained within the data; and
 wherein a definition of a data item can specify a basic data type or can be a reference to another metadata object describing the structure of the data.

* * * * *